May 19, 1970

C. B. GLATZ 3,512,805

MEANS FOR JOINING TWO CONDUITS

Filed Aug. 16, 1968

INVENTOR.
Charles B. Glatz
BY
*Edward M Farrell*
ATTORNEY

May 19, 1970   C. B. GLATZ   3,512,805
MEANS FOR JOINING TWO CONDUITS
Filed Aug. 16, 1968   2 Sheets-Sheet 2
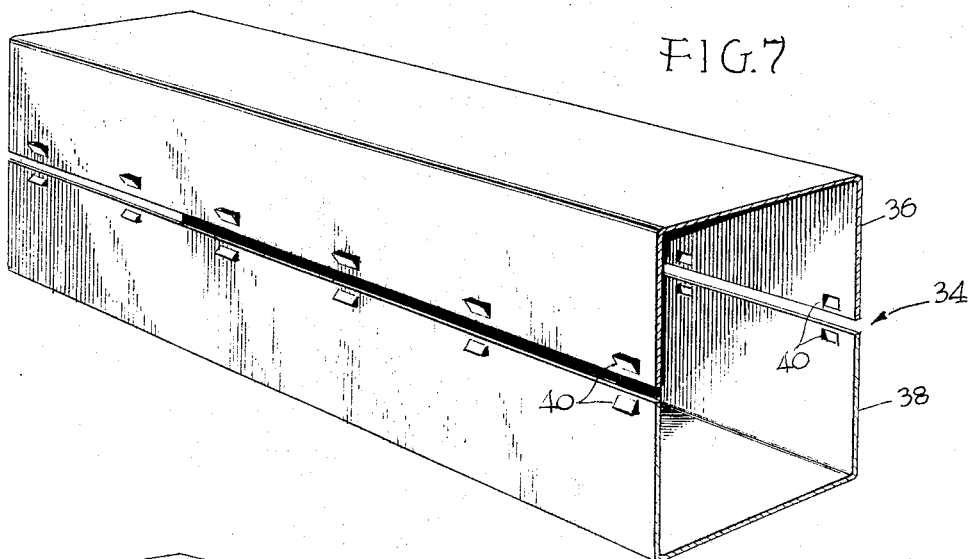
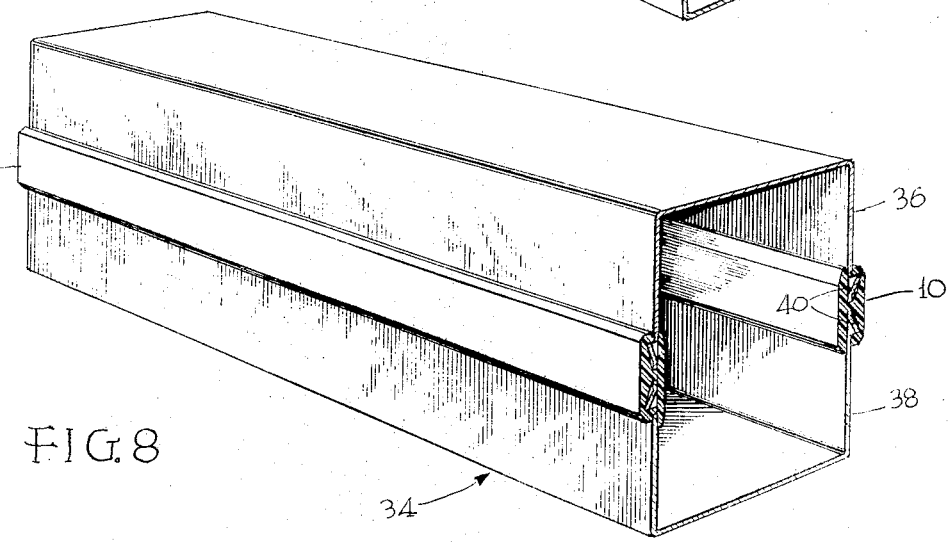
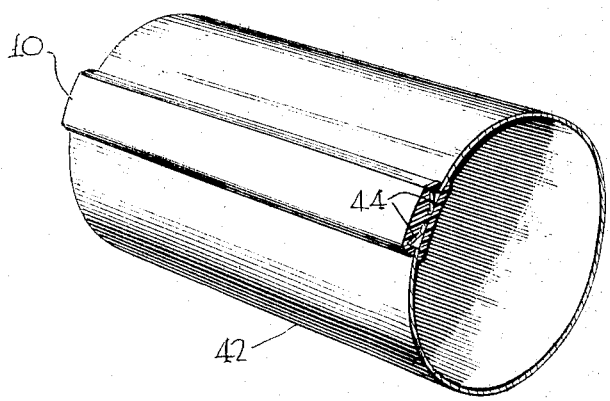
INVENTOR.
Charles B. Glatz
BY
Edward M. Farrell
ATTORNEY United States Patent Office 3,512,805
Patented May 19, 1970

3,512,805
MEANS FOR JOINING TWO CONDUITS
Charles B. Glatz, 113 Palmweed Ave., Ashland,
Cherry Hill Township, N.J. 08034
Filed Aug. 16, 1968, Ser. No. 753,171
Int. Cl. F16l 21/06, 25/00
U.S. Cl. 285—109          3 Claims

ABSTRACT OF THE DISCLOSURE

Means for joining two ducts are provided. A flexible strip including a pair of longitudinal grooved edges are provided to receive the ends of the ducts therein. The grooves in the strip receive the ends of the ducts. The strip is cut to the proper length to provide sealing completely around the ducts.

---

In air conditioning, heating ventilating and metal fabrication systems, individual sections of the conduits or ducts are necessarily limited in length. Because it is generally necessary to install relatively long continuous passages to cover large areas in a home or industrial plant, means are generally provided to join individual sections together.

The means to join the individual sections should provide relatively good sealing at the joints so as to minimize leakage. Also, the joints should be capable of minimizing noise which may result from the expansion and contraction of the sections as a result of changes in temperature. Vibration is also a problem in many cases if the joints are deficient in some respect.

While many different devices have been used as joining elements for duct work, they have in the main been relatively expensive and have required much time for proper installation.

One of the problems in the installation of air conditioning and heating systems has been associated with the wide variety of different sizes and shapes of the ducts that have to be handled by the workmen doing the installation. For example, square and rectangular ducts may be employed in some places, whereas in other places circular or oval duct work may be required. Very often, the installer of the system must have joint elements of special sizes and shapes for different jobs. This is not only costly but very inconvenient.

Another expensive and time consuming method of providing joints for ducts has involved the use of so called drive cleats and S plates. In this case, the ends of the ducts are bent over and adapted to receive a plate on each of four surfaces. Here the cleats or plates are cut to particular sizes and can be used with only one size and shape of duct.

Sometimes it is desirable to use basic prefabricated parts and utilize these parts to form the actual ducts in the field. This would lead to a reduction in the cost of parts involved and the labor of installation.

It is an object of this invention to provide an improved means for joining two conduits.

It is a further object of this invention to provide a novel means for joining two conduits of different sizes and shapes.

It is still a further object of this invention to provide an improved means for joining two conduits wherein improved sealing between the conduits is achieved.

It is still a further object of this invention to provide an improved means for joining two conduits wherein noise and vibrations are minimized.

It is still a further object of this invention to provide an improved means for joining two conduits wherein compensation is provided for the expansion and contraction of the conduits.

It is still a further object of this invention to provide an improved means for joining two conduits wherein the time for installing such means is minimized.

It is still a further object of this invention to provide an improved means for joining two conduits which is relatively inexpensive compared to the means used heretofore.

It is still a further object of this invention to provide a novel means for forming ducts from pre-made parts with a minimum expense.

In accordance with the present invention, a flexible strip includes longitudinally grooved edges for receiving the conduits therein. The grooves may have larger space areas towards the center of the strip to receive protruding locking sections on the conduits.

Other objects and advantages of the present invention will be apparent and suggest themselves to those skilled in the art from a reading of the following and claims, in conjunction with the accompanying drawing, in which:

Figure 6:
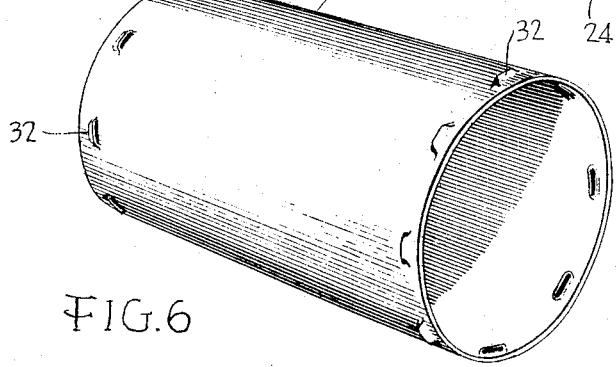

FIG. 6 illustrates a circular duct which may also be used in practicing the subject invention, FIG. 7 illustrates a pair of elongated members adapted to be joined together in accordance with the present invention, FIG. 8 illustrates the members of FIG. 7 in a joined condition, in accordance with the present invention, and FIG. 9 illustrates a circular duct joined along their longitudinal edges, in accordance with the present invention.

Figure 1:
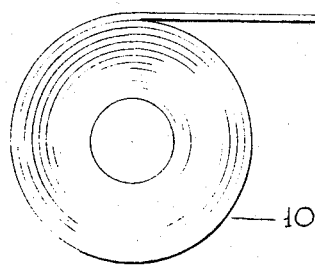
FIG. 1 illustrates a flexible strip in accordance with the present invention.
Figure 2:
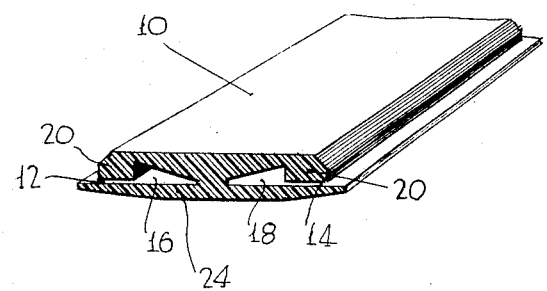
FIG. 2 illustrates a portion of the strip partly in cross section in accordance with the present invention.

Referring particularly to FIG. 2, the strip 10 includes a pair of longitudinally grooved grooves 12 and 14 adapted to receive the ends of conduits or ducts therein, as will be described. The grooves 12 and 14, include relatively large space areas 16 and 18, respectively. A pair of lip portions 20 and 22 extend inwardly towards the base portion 24, with narrow spaces therebetween.

The material comprising the strip 10 is sufficiently elastic so that it tends to return to its original form after it is bent. The strip, for example, may be of a thermoplastic material capable of withstanding temperatures of 200 degrees or more.

Figure 3:
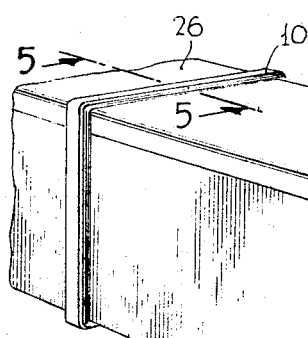
FIG. 3 is an isometric view illustrating section of ducts fully assembled and about to be assembled.
Figure 4:
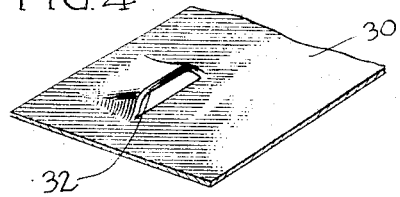
FIG. 4 is an enlarged view of the area in the broken box 4 illustrated in FIG. 3 showing one type of locking means which may be employed in practicing the present invention.
Figure 5:
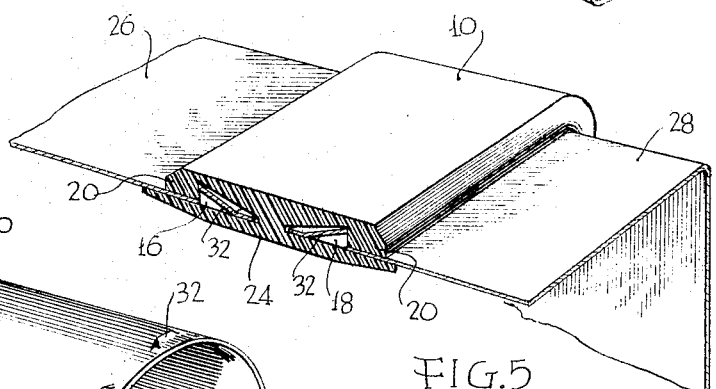
FIG. 5 is a cross sectional view taken along 5—5 of FIG. 1.

Referring to FIGS. 3, 4 and 5 along FIG. 2, a plurality of sections of ducts 26, 28 and 30 are positioned to be joined. The sections 26 and 28 are already joined by means of the strip 10, while the sections 28 and 30 are positioned to be joined.

All of the sections 26, 28 and 30 includes a plurality of protruding locking sections 32 disposed at the ends to be joined. The strip 10 is first put on the end of one of the sections. For example, the first operating step in joining may be to insert the groove 12 of the strip 10 into the end of the duct 26. The strip is extended around the end of the duct and then cut to the appropriate length. The protruding sections 32 of the duct 26 snaps into the large area 16 within the groove where the strip and duct will be maintained in locking engagement with each other.

After the strip 10 is placed on the end of the duct 26, the end of the duct 28 is inserted into the groove 14 of the strip 10. Again, the locking elements 32 disposed at the end of the duct 28 extends into the area 18. After the entire end of the duct 28 is inserted into the groove of the strip 10, a locking action takes place.

It is noted that the means for supporting the ducts are not illustrated, it being understood that the subject invention is not designed to give great structural support for the ducts but merely to provide good joint with good sealing between the ducts.

The protruding lips of section 20 contact the outer surfaces of the ducts in a sealing relationship. When the strip is completely installed, the base portion 24 will engage the inner surfaces of the ducts joined in a sealing relationship.

FIG. 6 illustrates a circular duct 30 which may be employed with the present invention. The strip 10 may be installed in substantially the same manner as that described in connection with the ducts 26 and 28. Because of absence of sharp bends at the corners, the round ducts offer some additional advantages when the present invention is used to join the ducts.

Referring to FIGS. 7 and 8 of the drawing, a pair of elongated U shaped metallic members 36 and 38 include a plurality of longitudinally disposed punched out sections or locking 40.

The strip 10 is disposed to join the longitudinal edges of the two half members 36 and 38 to form a rectangular duct 34. The grooves of the strip 10 receive the longitudinal edges of the members 36 and 38 in much the same manner as that described in connection with the joining of the sections 28 and 30 in FIG. 3.

Thus is it seen that the subject invention may be employed for forming ducts as well as for joining ducts. Of course, the half members 28 and 30 forming the duct 34 may take wide variety of different sizes and shapes to make ducts of different sizes.

Referring particularly to FIG. 9, a circular duct 42 has its longitudinal edges joined by the strip 10. A plurality of protruding sections or locking elements 44 are received by the grooves of the strip in the manner illustrated to form the circular duct.

The strip 10 may be formed of any one of a number of materials. In general, the material should be flexible and capable of withstanding a wide range of different temperatures. One such material may be polyethylene, although in some cases, Teflon, neoprene, silicone rubber or some other similar type material may be used. Also, some thermoplastic and thermoset materials capable of withstanding high temperature may also be used.

The strip 10 may be formed by a number of well known extrusion methods. For example, a powder of the proper material may be inserted into an extruder and subjected to heat. Pressure may be simultaneously applied by means of screw or ram extrusion elements through a suitably shaped die to obtain the cross sectional configuration of the strip 10. Such extrusion methods are well known to those skilled in the art and therefore such methods are not illustrated or described in detail.

In installing the strip, it may be desirable to cut the strip to a slightly longer length than required. Thus after the segmented portion is installed, the free ends of the strip will tend to compress against each other to produce a good sealing action. Alternately, if necessary a sealing tape may be employed to seal the ends of the strip to prevent possible leakage after installation.

It is apparent that in many installations where the number of joints and sizes of ducts are known that a workman may pre-cut individual segments to the correct size. To minimize the tolerance requirements, the ends of the strips cut may be taped, as mentioned.

Regarding the round ducts, the rings of the proper size may of course be preformed. In this case, the only installation required would be the snapping of the rings onto the ends of the ducts. Such rings could be molded or the ends could be taped.

While square and circular ducts have been illustrated, it is apparent that the shapes of the ducts could take any form such as oval or rectangular shapes.

In some cases, it may be desirable to have small grooves cut across the top or bottom of the strips 10 to give greater flexibility. This may be done during or after the extrusion operation. Marks could also be put on the tape to indicate distances such as inches, to assist workmen who may wish to cut the strip to predetermined lengths. Also, the strip 10 may be automatically cut to predetermined lengths as it is being extruded, if desired.

While the strip illustrated includes large space areas in the grooves toward the center, these enlarged space areas may not be important in all cases. For example, the conduits may not have protruding locking sections. The longitudinal grooves in that case could simply receive the ends of the conduits. Because the conduits will generally be supported by separate means, not illustrated, a locking action may not be required and it is only necessary to extend both ends of the conduits into the slits or grooves of the strip.

Generally, after the ends of the conduits have been inserted into the grooves of the strip, it is desirable to maintain some space within the grooves to compensate for expansion and contraction of the sections of ducts.

While the dimensions of the parts illustrated are not critical, generally the dimensions of the strip will bear some relationship to the sections of ducts, i.e. the larger or wider strip.

In some cases, it may be desirable to have inserts or stiffeners inserted in the strip. However, such inserts should have a certain degree of flexibility if they are used.

As mentioned, the subject invention makes it possible to fabricate ducts in the field as well as to provide means for joining ducts.

What is claimed is:

1. In combination with a pair of sheet metal ducts to be joined together at their ends, the walls of said ducts having struck therefrom locking tabs disposed close to the ends thereof at an acute angle relative to said walls and having the free ends thereof facing away from said ducts ends, a one-piece plastic flexible strip capable of withstanding relatively high temperatures and adapted to be cut into lengths corresponding to the peripheries of said metal ducts, said strip including a bottom base section, a top section and an intermediate section integrally joining the central portions of said base and top sections in spaced relationship, said top section including inwardly protruding lip portions longitudinally disposed at the edges of said strip along its entire length and tapered surface portions extending inwardly from the base of said lip portions to said intermediate section to form relatively large space areas to receive said locking tabs therein to maintain said ducts in lock relationship with respect to each other, said lip portions being spaced from said base section to sealingly engage the external surfaces of said metal ducts, said base section being relatively thin and having an uninterrupted smooth surface to sealingly engage the interior surfaces of said metal ducts.

2. The invention as set forth in claim 1 wherein said strip is adapted to be rolled in relatively large rolls with said strip being capable of being used with ducts of different sizes and shapes.

3. The invention as set forth in claim 2 wherein said flexible strip comprises an extruded article.

References Cited

UNITED STATES PATENTS

| | | | |
|---|---|---|---|
| 3,191,727 | 6/1965 | Schmeltz et al. | |
| 3,216,538 | 11/1965 | Miller | 52—495 X |
| 2,123,889 | 7/1938 | Gleason | 285—371 X |
| 2,275,572 | 3/1942 | Somers | 285—398 X |
| 2,470,359 | 5/1949 | McLean | 285—109 |
| 2,498,753 | 2/1950 | Deitsch | 285—424 X |
| 2,713,381 | 7/1955 | Seck. | |
| 2,739,089 | 3/1956 | Hageltorn. | |
| 3,100,658 | 8/1963 | Miller et al. | 285—293 X |
| 3,231,156 | 1/1966 | Schultz. | |
| 3,317,087 | 5/1967 | Landis | 285—235 X |

FOREIGN PATENTS

| | | |
|---|---|---|
| 253,088 | 3/1964 | Australia. |
| 565,072 | 10/1958 | Canada. |
| 839,997 | 5/1952 | Germany. |

THOMAS F. CALLAGHAN, Primary Examiner

U.S. Cl. X.R.

285—331, 398, 424